(12) United States Patent
Nakamura et al.

(10) Patent No.: US 7,408,577 B2
(45) Date of Patent: Aug. 5, 2008

(54) BIASING SCHEME FOR LARGE FORMAT CMOS ACTIVE PIXEL SENSORS

(75) Inventors: Junichi Nakamura, Tokyo (JP); Isao Takayanagi, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 959 days.

(21) Appl. No.: 10/409,108

(22) Filed: Apr. 9, 2003

(65) Prior Publication Data

US 2004/0201550 A1    Oct. 14, 2004

(51) Int. Cl.
  *H04N 3/14*   (2006.01)
  *H04N 5/335*  (2006.01)
  *H04N 5/217*  (2006.01)
(52) U.S. Cl. .................. 348/308; 348/302; 348/241
(58) Field of Classification Search .......... 348/241, 348/302, 308; 250/208.1; 257/292
  See application file for complete search history.

(56) References Cited

U.S. PATENT DOCUMENTS 5,841,126 A * 11/1998 Fossum et al. ............ 250/208.1
5,869,857 A * 2/1999 Chen ........................... 257/292
6,097,022 A    8/2000 Merrill et al.
6,211,510 B1   4/2001 Merrill et al.
6,410,899 B1   6/2002 Merrill et al.
6,512,544 B1 * 1/2003 Merrill et al. ............... 348/302

OTHER PUBLICATIONS

CMOS Imagers, Sensors and Displays/Paper 12.5, 2003 IEEE International Solid-State Circuits Conference.
0.79 Single Panel Liquid Crystal on Silicon Backplane IC with 1408 8-bit DACS for HDTV Applications, S. Baik, Y. Cha, Y. Hwang, J. Chung, Y. Shin, Research Center, ATLab Inc., Korea; K. Jang, J. Jeong, Corporate R&D Center, Samsung SDI Co., Ltd., Korea; B. Cho, DTV Business, Samsung Electronics Co., Ltd., Korea.

* cited by examiner

*Primary Examiner*—David Ometz
*Assistant Examiner*—Wanda M Negron
(74) *Attorney, Agent, or Firm*—Dickstein Shapiro LLP

(57) ABSTRACT

An image sensor includes circuitry compensating for voltage drops in a $V_{SS}$ line. The image sensor includes a plurality of photoreceptors arranged in a pixel array having a number of column lines, and read-out circuitry on the column lines. The read-out circuitry provides substantially equal currents on each column line so as to compensate for voltage drops in the $V_{SS}$ line and provide more accurate pixel signals. The image sensor also includes circuitry for filtering noise from a voltage supply line, and for providing hard and/or soft reset operations.

18 Claims, 15 Drawing Sheets

BIASING SCHEME FOR LARGE FORMAT CMOS ACTIVE PIXEL SENSORS

BACKGROUND OF THE INVENTION

1. Field of the Invention

The invention relates to active pixel sensor arrays and, more particularly, to a biasing arrangement for complementary metal oxide semiconductor (CMOS) active pixel sensor arrays.

2. Description of the Related Art

Active pixel sensor (APS) imaging devices are described in U.S. Pat. No. 5,471,515, for example. APS imaging devices include an array of pixel cells, generally arranged in rows and columns. Each pixel cell includes a photodetector (e.g., photodiode) that converts light energy into electric signals. The pixel cell also includes one or more transistors. The transistors typically provide amplification, read-out control, and reset of the photodetector signal, and operate to provide reset signal and a photodetector pixel signal as output signals from the pixel cell.

The architecture of a conventional imaging device with a CMOS APS 2 is illustrated in FIGS. 1 and 2. APS 2 includes a row and column array of pixel cells 4. As illustrated in FIG. 1, array rows are oriented horizontally, and array columns are oriented vertically. The 4×4 array pictured in FIG. 1 is merely illustrative. Typical APS arrays are fabricated as much larger arrays.

Referring more specifically to FIG. 2, a representative three transistor (3T) pixel cell 4 is shown as including a photodiode 6 (PD) and a readout portion which includes a source follower transistor 8 ($M_D$) and a row select transistor 10 ($M_{SEL}$). Pixel cell 4 has a drain of source follower transistor 8 ($M_D$) connected to voltage line 12 ($V_{AA\_PIX\_COL,j}$). The source of the row select transistor 10 ($M_{SEL}$) is connected to a column line 14 of the cell array to which a load transistor 16 ($M_{LD}$) also is connected. The load transistor 16 ($M_{LD}$) acts as a current sink for a bias current $I_{BIAS\_PIX}$. Thus, each pixel 4 includes a source follower arrangement of transistors 8, 10, with the pixel and a common current sink transistor 16 for each array column.

The operation of APS 2 will be described with reference to the timing diagram of FIG. 3. The photodiode 6 is reset by pulsing a reset transistor 18 ($M_{RS}$) with a reset pulse $\Phi_{RS}$. During the ensuing integration (exposure), the photodiode 6 voltage is decreased by the photo current. After the predetermined integration period, a row select pulse $\Phi_{SEL}$ turns ON and an output signal appears at the node denoted by $V_{OUT}$ (FIG. 2).

The output signal voltage is given by Equation 1, as follows:

$$V_{OUT,sig} = A_V(V_{RS,pix} - \Delta V_{sig} - (V_{th} - \delta V_{th})) \quad (1)$$

where $A_V$, $V_{th}$, $V_{RS,pix}$ and $\Delta V_{sig}$ are the voltage gain ($A_V$) and the threshold voltage ($V_{th}$) of the source follower, the initial photodiode voltage ($V_{RS,pix}$) just after the reset, and the voltage swing (drop) ($\Delta V_{sig}$) caused by the accumulation of the signal electrons on the photodiode, respectively.

$V_{th}$ represents a deviation of the effective threshold voltage, which gives rise to fixed pattern noise (FPN) in the array. FPN (also called nonuniformity) is spatial variation in pixel output values under uniform illumination due to device and interconnect parameter variations (mismatches) across the sensor. It is fixed for a given sensor, but varies from sensor to sensor. FPN increases with illumination, but causes more degradation in image quality at low illumination. CMOS (APS) sensors have higher FPN than charge-coupled devices (CCDs) and suffer from column FPN, which may appear as shadow stripes in the image and can result in image quality degradation.

The output signal voltage $V_{OUT,sig}$ for a column pixel is sampled and held on a first capacitor in a sample and hold (S/H) circuit 20 (FIG. 1). Then the photodiode is reset again, and the output reset voltage is sampled and held on a second capacitor in sample and hold (S/H) circuit 20.

The output reset voltage is given by Equation 2, as follows:

$$V_{OUT,rs} = A_V(V_{RS,pix} - (V_{th} - \delta V_{th})) \quad (2)$$

The signal voltage swing, representing the light-induced signal on the photodiode, can be extracted by subtracting (1) from (2), which yields:

$$V_{SIG} = A_V \Delta V_{sig} \quad (3)$$

Thus, variations in $V_{RS,pix}$ and $V_{th}$ are eliminated, in principle.

Referring again to FIG. 1, a row select circuit 22 selects a row to be reset or readout. All rows are selected for read out in sequential fashion. The S/H circuit 20 performs sample and hold operations for the reset and pixel signals for each of the array columns, which are represented by equations (1) and (2). The outputs of the S/H block 20 are fed to a differential amplifier which subtracts the two signals to produce $V_{SIG}$ in accordance with equation (3). This signal is then digitalized and sent to an image processor with other signals from the pixels of array 2.

The FIG. 3 pulse timing diagram illustrates the operation of the image sensor shown in FIG. 1 having photodiode active pixels. Conventionally, the row select and sample-and-hold operations are performed in a row-by-row fashion, represented in FIG. 3 by these successive rows i−1, i, and i+1. A period at the start of each frame between the end of the last row select and the beginning of the first row select is called the vertical blanking period (V_BL).

In a large format array based on the representative architecture shown in FIG. 1, a problem occurs due to the voltage (I-R) drop along the $V_{SS}$ line, which couples ground to all the column circuit sink transistors 16 as illustrated in FIG. 4. During the readout period, voltage drops along the $V_{SS}$ line, which is typically grounded at terminal $AV_{ss}$, cannot maintain the established (ground) level for each column line due to parasitic resistances $R_{SS}$ denoted in FIG. 4. The graph of FIG. 5 illustrates the voltages on column lines 1 to $j_{max}$ as shown, those column lines farthest from terminal $AV_{ss}$ have a voltage above ground while those closest to $AV_{ss}$ have voltages at or near ground along the line $V_{SS}$.

The voltage drops along the line $V_{SS}$ impact the bias currents $I_{BIAS\_PIX}$ produced by column line transistors 16. The bias current is given by Equation (4), as follows:

$$I_{BIAS\_PIXS,i} = \beta/2 \cdot (V_{GS,i} - V_{TH})^2 = \beta/2 \cdot (V_{LN} - V_{SS\_PIX\_COL,i} - V_{TH})^2 \quad (4)$$

where $\beta$, $V_{GS,i}$, and $V_{SS-COL,i}$ are a process and size dependent parameter ($\beta$), the gate-source voltage for the j-th load transistor ($V_{GS,i}$), and the $V_{SS}$ voltage at the column J ($V_{SS\_PIX\_COL,i}$), respectively. Thus, as $V_{SS\_PIX\_COL,i}$ becomes higher than $V_{SS}$, bias current decreases. The change in the output voltage due to the higher $V_{SS}$ is given approximately by Equation (5) as follows:

$$\Delta V_{OUT} = \sqrt{\frac{\beta_{LD}}{\beta_D}} \cdot \Delta V_{SS} \quad (5)$$

where $\beta_{LD}, \beta_D, v_{SS}$ are $\beta$ for $M_{LD}$ and $M_D$, and the voltage change on the $V_{SS}$ line, respectively. If a fixed pattern noise (FPN) suppression operation, where the signal voltage swing is extracted by subtracting Eq. 1 from Eq. 2, is not performed, shading appears in a reproduced image. By applying such an FPN suppression operation, shading caused by the voltage change on $V_{SS}$ line, expressed by Eq. 5, may be suppressed. However, other shading will still be present.

Shading may be caused, for example, by decreased bias currents due to the reduced effective gate-source voltage $V_{GS}$ of the load transistor 16 ($M_{LD}$), which may result in variations in time constants for charging and discharging the sample and hold capacitors $C_{SHS}$ or $C_{SHR}$ within the sample and hold circuit 20. The capacitor $C_{SHS}$ and $C_{SHR}$ respectively sample and hold the pixel output signal and reset output signal. The time constants are given approximately by Equation 6, as follows:

$$\tau = \frac{C_{SHX}}{g_m} = \frac{C_{SHX}}{\sqrt{2 \cdot \beta \cdot I_{BIAS\_PIX}}} \quad (6)$$

Thus, the resulting voltages on the sample and hold capacitors may change when the pulse width of the sample-and-hold pulse is comparable to the time constant. The pulse width of the sample-and-hold pulse may be comparable to the time constant since higher resolution image sensors require shorter pulse widths to obtain a given frame rate. Another related concern is the source follower gain variation due to the decreased bias current.

Similar voltage drops occur along a voltage line 24 which supplies the pixel voltage $V_{AA\_PIX}$, as a result of parasitic resistances $R_{AA}$ along that line, as shown in FIG. 4. The voltage changes here affect the pixel output voltage little, however, since the driver transistor 8 ($M_D$) of each pixel cell (FIG. 2) operates in the saturation region and thus the drain voltage does not affect its drain current. A problem arises, however, during the reset operation.

There are two modes of pixel reset operation, "hard" and "soft." A "hard reset" refers to a reset where the reset transistor 18 ($M_{RS}$) operates in its linear region. The initial voltage of the photodiode $V_{RS,pix}$ is given by Equation 7, as follows:

$$V_{RS,pix} = V_{AA\_PIX\_COL} \quad (7)$$

To make reset transistor 18 ($M_{RS}$) operate in its linear region, a pulse height of the reset pulse $\Phi_{RS}$ should be higher than $V_{AA\_PIX\_COL}$ by $V_{th}$, where $V_{th}$ is the effective threshold voltage of the reset transistor 18. Noise associated with the 'hard' reset is given approximately by Equation 8, as follows:

$$V_{hard}^2 = kT/C_{PD} \quad (8)$$

where k is the Boltzmann's constant, T the absolute temperature in K and $C_{PD}$ is the capacitance of photodiode 6, respectively.

A "soft reset" refers to a reset where the reset transistor 18 ($M_{RS}$) operates first in its saturation region, and then in the sub-threshold region. An initial voltage $V_{RS,pix}$ of photodiode 6 is given by Equation 9, assuming the pulse height of the reset pulse $\Phi_{RS}$ is equal to $V_{AA\_PIX}$, as follows:

$$V_{RS,pix} = V_{AA\_PIX\_} - V_{th} \quad (9)$$

When the pulse height of the reset pulse $\Phi_{RS}$ is equal to $V_{AA\_PIX}$, reset transistor 18 ($M_{RS}$) operates in its saturation region. The final stage at the reset operation is dominated by the sub-threshold operation. Reset noise associated with the 'soft' reset is given approximately by Equation 10, as follows:

$$v_{soft}^2 = kT/2C_{PD} \quad (10)$$

Although the noise associated with the soft reset is less than that associated with the hard reset, there are other concerns with the soft reset. For example, the soft reset yields non-linearity in low light level photo-conversion characteristics of the pixel cell. The soft reset also yields image lag due to the fact that the final stage at the reset operation is dominated by the sub-threshold operation of the reset transistor 18. Therefore, the hard reset is preferable to the soft reset, especially for motion picture applications, for example.

In order to perform the hard reset, the pulse height of the reset pulse $\Phi_{RS}$ should be higher than $V_{AA\_PIX\_COL}$ by $V_{th}$, which requires an additional voltage pump circuit in a row select pulse generation circuit (assuming that $V_{AA\_PIX}$ is the highest voltage supplied to the image sensor.) There may be a case, however, in which the soft reset is applicable when noise performance and dynamic range are the most important performance parameters.

If a large format array is built based on the architecture shown in FIG. 1, a problem associated with the hard reset occurs due to the voltage (I·R) drops along the $V_{AA\_PIX}$ line. When a row is selected for readout, the pixel bias currents $I_{bias,pix}$ flow from $V_{AA\_PIX}$ to AVSS as shown in FIG. 4. During this row select period, voltages along the $V_{AA\_PIX}$ line cannot maintain an appropriate level, as shown in FIG. 6, due to parasitic resistances $R_{AA}$ along the $V_{AA\_PIX}$ line.

The pixel reset $\Phi_{RS}$ is applied after the signal voltage sampling ($\Phi_{SHS}$='H') while the row select pulse $\Phi_{SEL}$ is kept on, as shown in the timing diagram of FIG. 3. Since the pixel reset voltage, which is a drain voltage of $M_{RS}$, is $V_{AA\_PIX}$, as expressed by Eq. 7, the initialized voltage of each photodiode $V_{RS,pix}$ on a row is not identical, as shown in FIG. 6. In addition, if the $V_{AA\_PIX}$ line is contaminated by noise, that noise is sampled on a photodiode.

BRIEF SUMMARY OF THE INVENTION

The present invention provides readout circuitry for each column of an APS device array in which substantially equal sink currents exist on each column line or in which sink currents are not employed.

In a first exemplary embodiment of the invention, a capacitor loaded source follower transistor is provided for each pixel so that no bias currents are needed. In a second exemplary embodiment of the invention, a level shift circuit is associated with each column line load transistor to apply a constant gate-source voltage to the load transistor. In a third exemplary embodiment a clamp circuit is associated with each column line. In a fourth exemplary embodiment, a differential amplifier is associated with each column line to sink a constant current.

In another exemplary embodiment, a transistor is placed between the line $V_{AA\_PIX}$ and the column line $V_{AA\_PIX\_COL}$. By making the transistor, preferably an n-MOS transistor, operate in its saturation region, noise on the $V_{AA\_PIX}$ line can be filtered out. Further, by adding a p-MOS transistor in parallel with the n-MOS transistor, a more reliable hard or soft reset operation of the pixel cell can be obtained.

BRIEF DESCRIPTION OF THE DRAWINGS

The foregoing and other features of the invention will become more apparent from the detailed description of exemplary embodiments of the invention given below with reference to the accompanying drawings, in which.

DETAILED DESCRIPTION OF THE INVENTION

Figure 2:
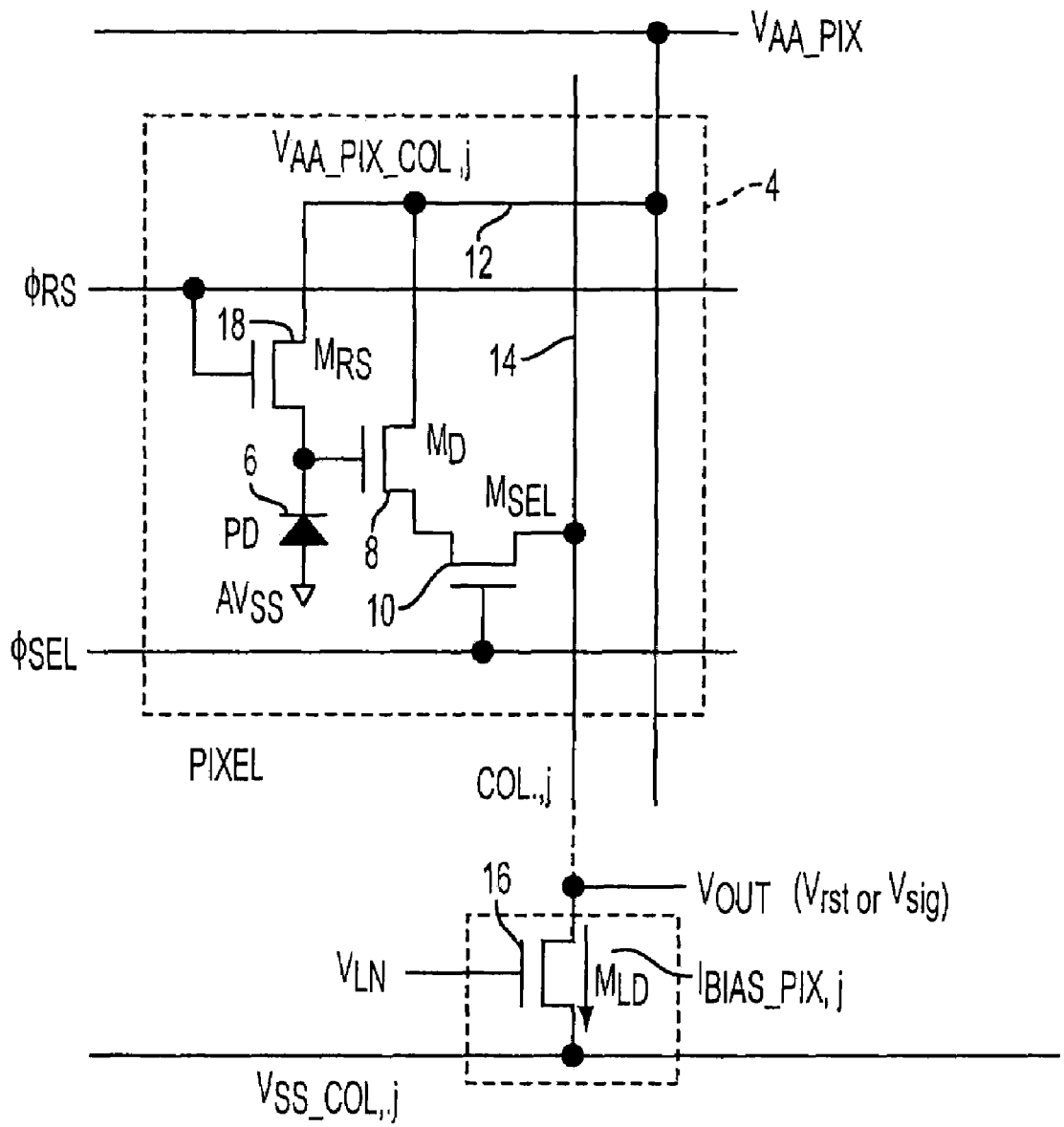
FIG. 2 is a schematic illustrating a pixel configuration of the conventional CMOS APS of FIG. 1.
Figure 3:
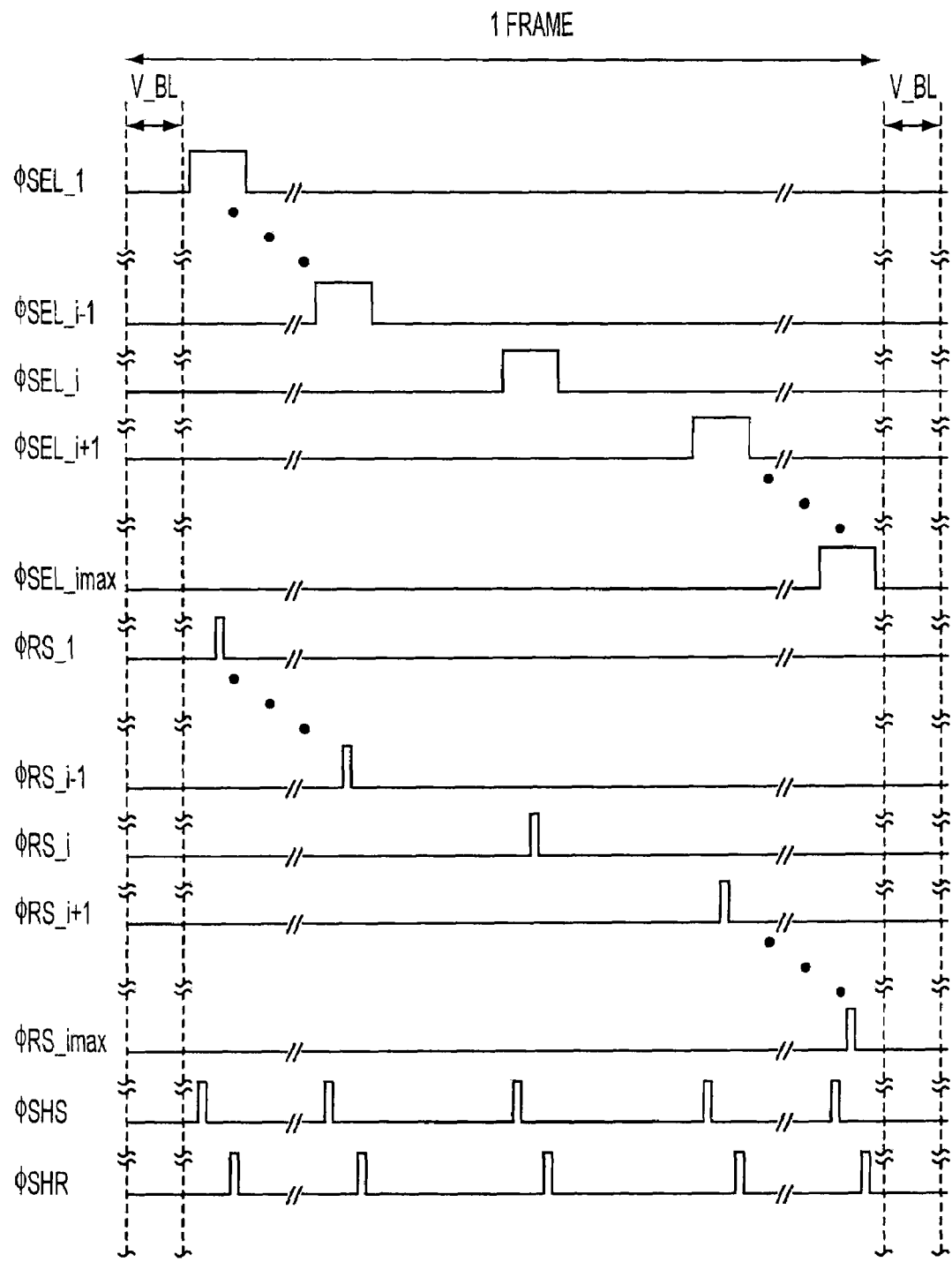
FIG. 3 is a pulse diagram for the CMOS APS of FIG. 1.
Figure 4:
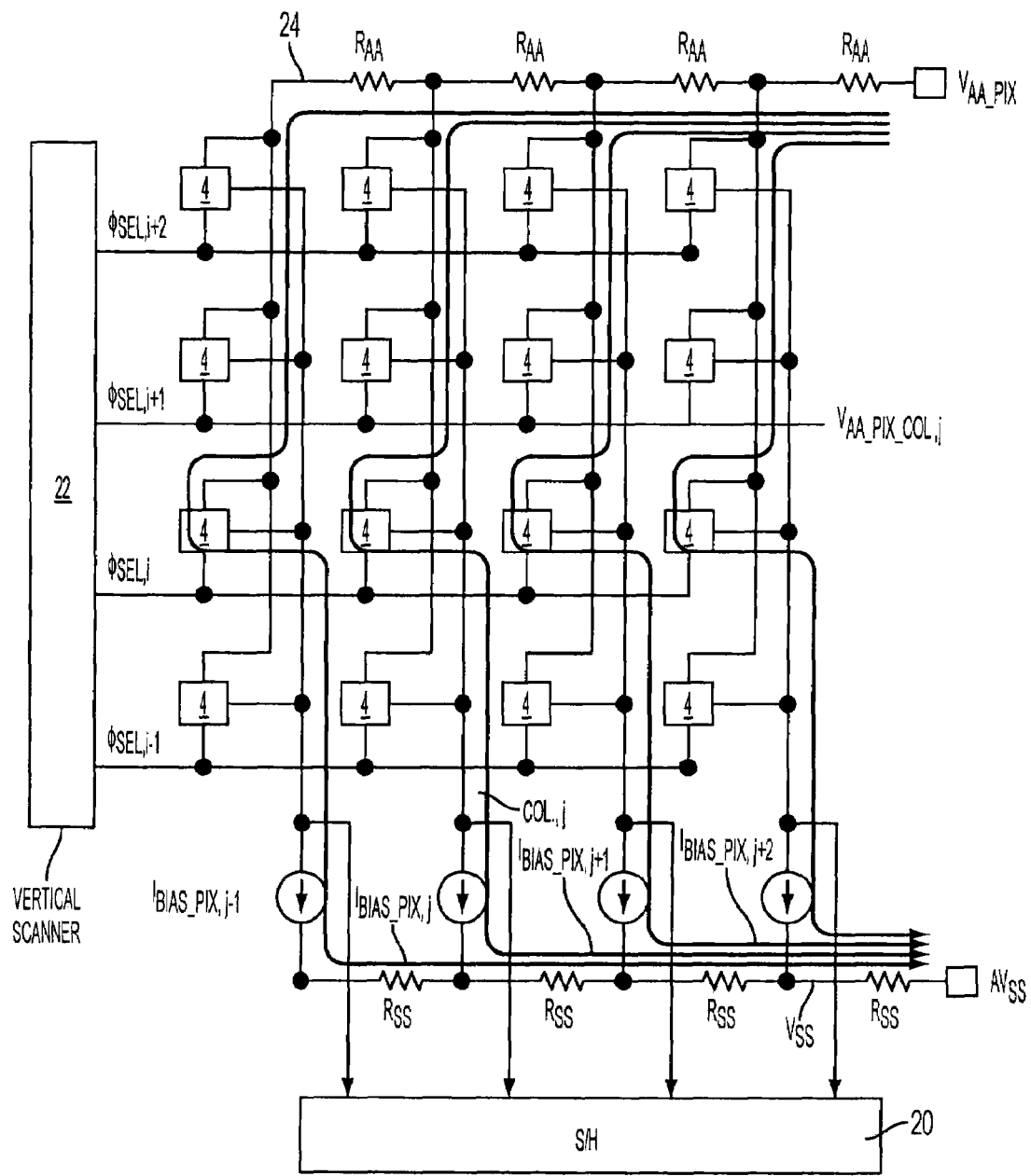
FIG. 4 illustrates current paths and parasitic resistances in the conventional CMOS APS of FIG. 1.
Figure 5:
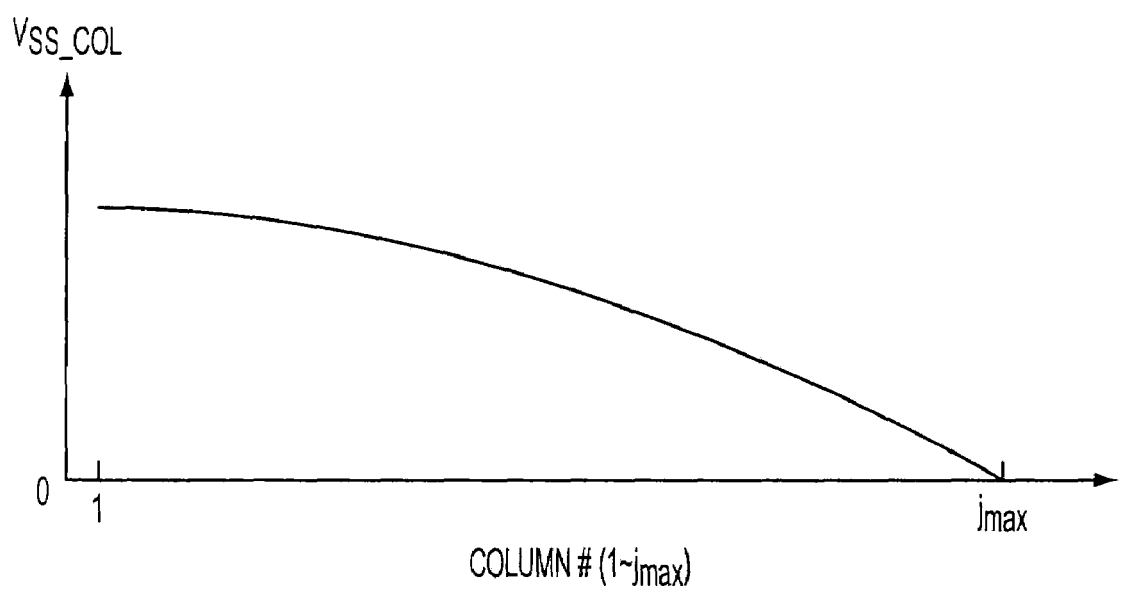
FIG. 5 is a graph illustrating voltage drops along the $V_{SS}$ line in the conventional CMOS APS of FIG. 1.
Figure 7:
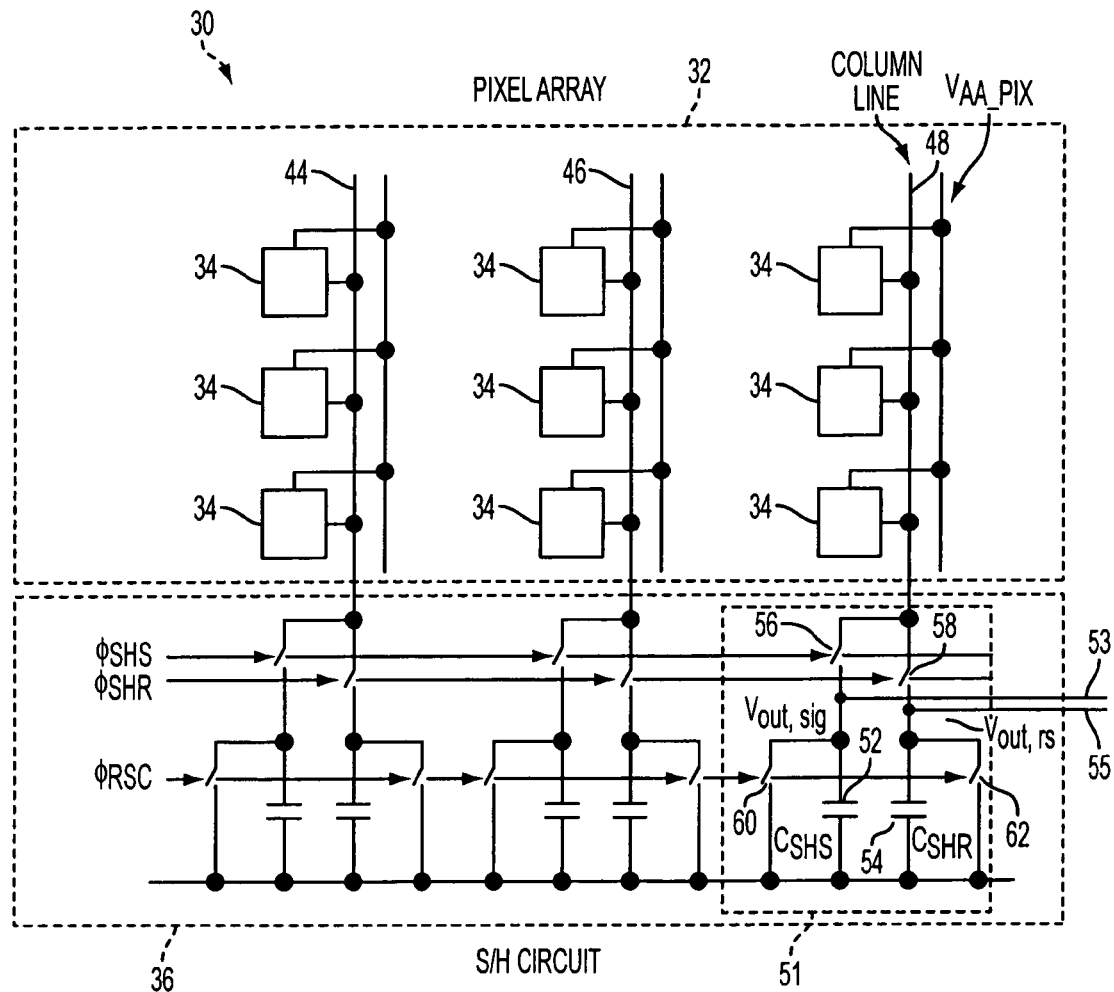
FIG. 7 is a circuit diagram of a pixel array having capacitor loaded source follower read-out circuitry according to a first exemplary embodiment of the invention.

Referring initially to FIG. 7, an APS 30 according to an exemplary embodiment of the present invention is shown. APS 30 includes a number of pixels 34 arranged in an array 32. Pixels 34 may employ many different architectures, including the 3 transistor (3T) architecture shown in FIG. 2 or 4 transistor (4T) or higher order transistor architectures known in the art. APS 30 does not use the FIG. 2 current sink transistor 16, but rather employs a capacitor loaded source follower formed by connecting the column lines 44, 46, 48 of the array to sample and hold circuit 36 in the manner shown in FIG. 7. Consequently, the load transistor 16 of FIG. 2 is eliminated from the circuit. For clarity, certain features of APS 30 not critical to the invention have been eliminated in the drawing of FIG. 7.

Column read-out circuitry of this embodiment will be described for column 48 as being representative of other columns in the array. Connected to column line 48 is a read-out circuit 51 provided in S/H circuit 36. The read-out circuit 51 includes two capacitors 52 ($C_{SHS}$) and ($C_{SHR}$) connected in series with column line 48. These two capacitors effectively replace the load transistor 16 ($M_{LD}$) shown above in the conventional arrangement of FIG. 2, forming two capacitor-loaded source follower circuits with transistor 8 ($M_D$), connected to capacitor 52 ($C_{SHS}$) or 54 ($C_{SHR}$) through column select transistor 10 ($M_{SEL}$).

Signal acquisition and reset of the read-out circuit are controlled by a sample and hold signal $\Phi_{SHS}$, supplied to switch 56, a sample and hold reset signal $\Phi_{SHR}$, supplied to switch 58, and a capacitor reset pulse $\Phi_{RSC}$ supplied to switches 60 and 62.

Operation of the embodiment of FIG. 7 is described below. Although the description is for the conventional PD APS pixel cell 4, shown in FIG. 2, any other pixel cell structure can be used.

Figure 8:
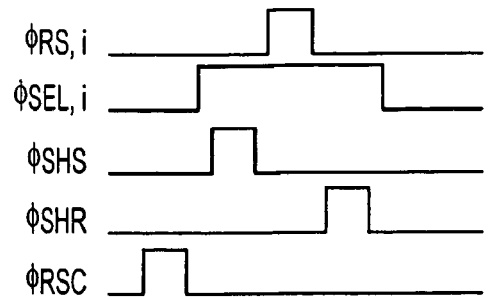
FIG. 8 is a pulse timing diagram for the embodiment of FIG. 7.

Just before the sample and hold operation for the pixels on any one of the rows i, the hold capacitors 52 ($C_{SHS}$) and 54 ($C_{SHR}$) are reset to ground ($V_{SS}$) by turning $\Phi_{RSC}$ on. Then the row select pulse $\Phi_{SEL,i}$ is turned on (see FIG. 8 timing diagram). When the sample pulse for signal $\Phi_{SHS}$ is turned on, switch 56 closes and the pixel output $V_{OUT,sig}$ is sampled onto capacitor 52 ($C_{SHS}$). After $\Phi_{SHS}$ is turned off, the pixels on the i-th row are reset by the reset pulse $\Phi_{RS,i}$. Then, the sample pulse for reset signal $\Phi_{SHR}$ is turned on and switch 58 closes, and the reset signal $V_{OUT,rs}$ is sampled on capacitor 54 ($C_{SHR}$). Lines 53 and 55 represent output lines to other circuitry which processes the signals held on capacitors 52 and 54.

The signal voltage $V_{OUT,sig}$ and $V_{OUT,rs}$ are given by Equations (1) and (2), above. In this capacitive loaded source follower, the hold capacitors 52, 54 are charged up to a voltage level expressed by Equations (1) or (2). With this arrangement, the current flow through the driver transistor 8 ($M_D$) of a pixel does not cause current flow and thus voltage drops on the $V_{SS}$ line, which affect the sampled and held signals.

Figure 9:
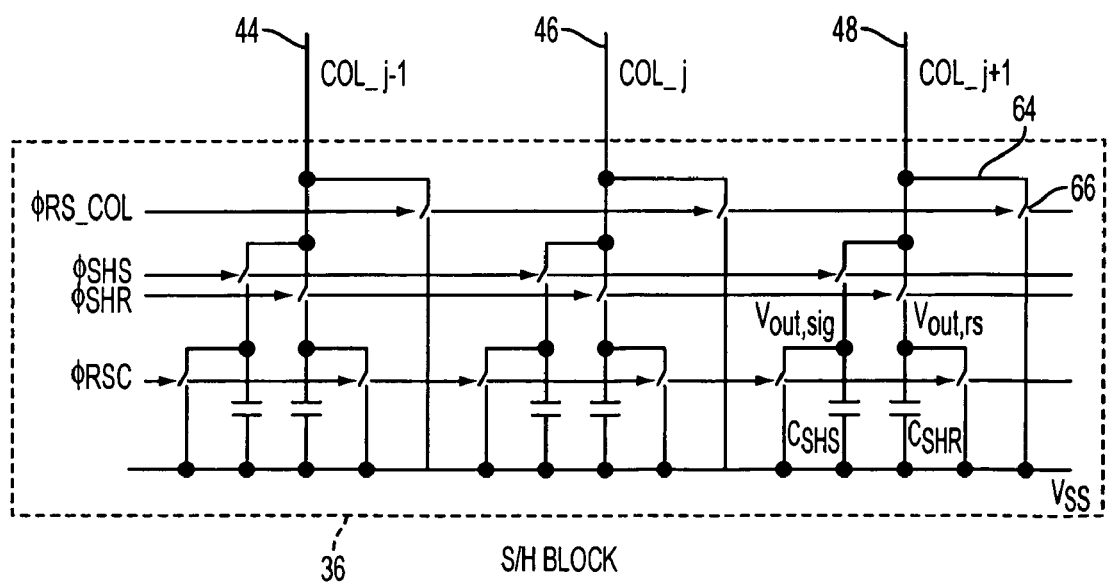
FIG. 9 is a circuit diagram illustrating a modification to the embodiment of FIG. 7.
Figure 10:
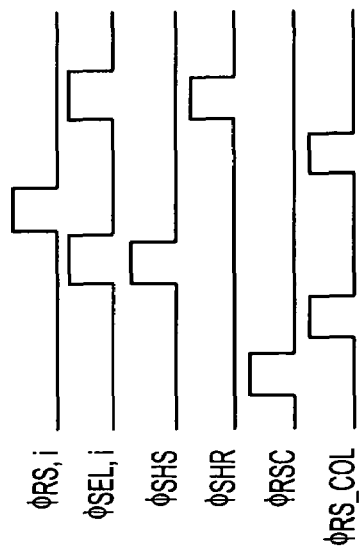
FIG. 10 is a pulse timing diagram for the embodiment of FIG. 9.

FIG. 9 shows a modification of the embodiment of FIG. 7 in which a line 64 connects column line 48 to ground ($V_{SS}$) by way of a switch 66 controlled by a signal $\Phi_{RS\_COL}$. A timing diagram is shown in FIG. 10. The arrangement of FIG. 9 allows the use of a reset signal $\Phi_{RS\_COL}$ to reset column line 48 to ground ($V_{SS}$), before the sample-and-hold pulses are turned on and the row select pulse is applied.

Figure 1:
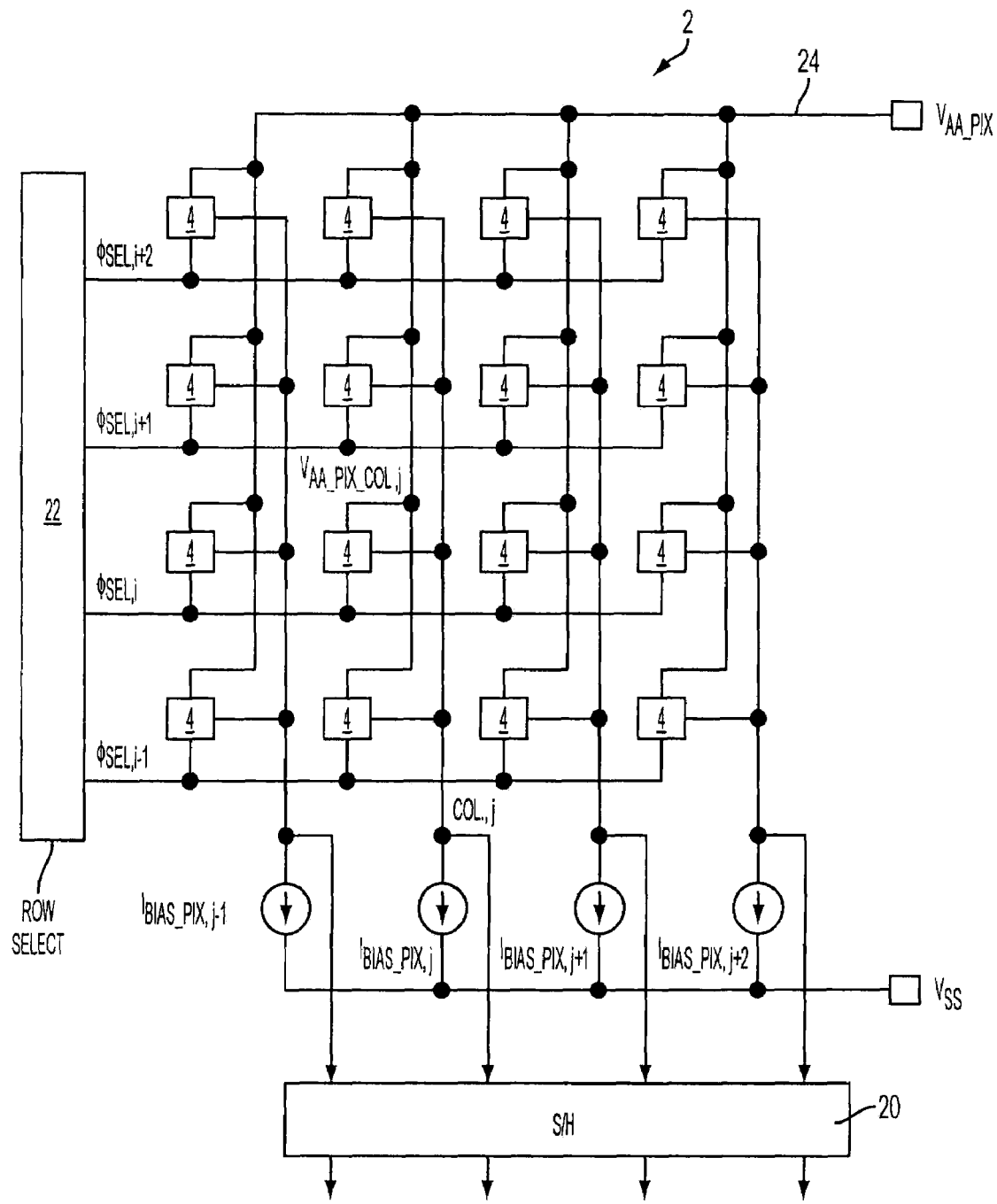
FIG. 1 is a block diagram of a conventional CMOS APS.
Figure 11:
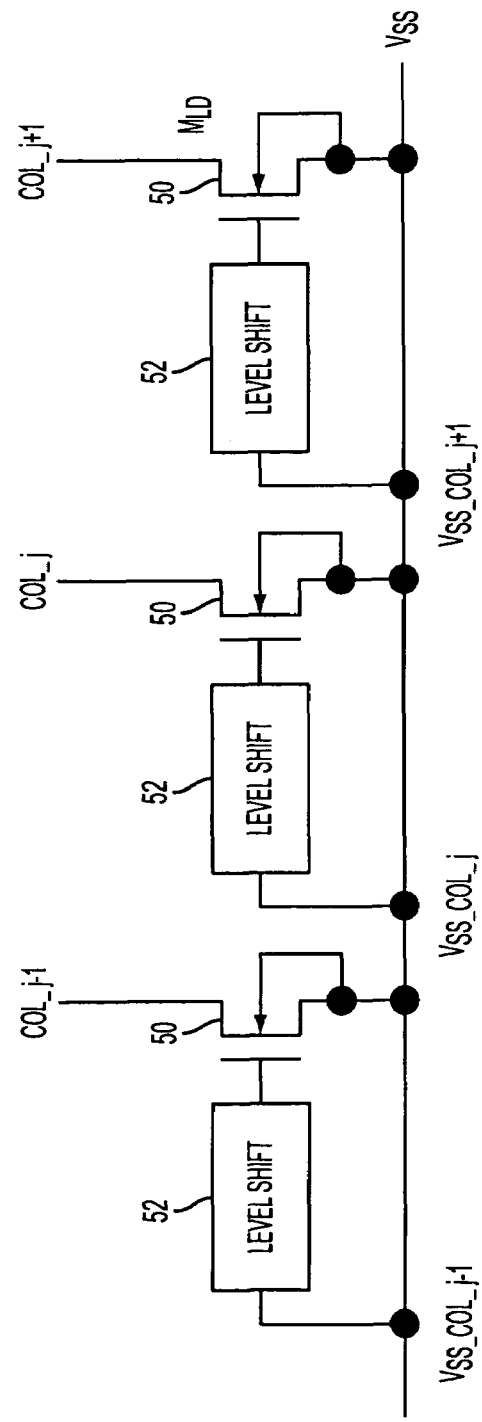
FIG. 11 is a circuit diagram of a read-out circuit for a pixel array according to a second exemplary embodiment of the invention.

Referring to FIG. 11, another exemplary embodiment of the present invention is shown in which a level shift circuit 52 is used to maintain a constant gate-source voltage as applied to a load transistor 50 ($M_{LD}$). FIG. 11 shows a block diagram of a column readout bias portion of an APS, such as the conventional APS described above in connection with FIGS. 1 and 2. Load transistors 50 ($M_{LD}$), corresponding to load transistor 16 in FIG. 2, are arranged with a level shift circuit 52 inserted between the $V_{SS}$ line and the gate of each load transistor 50 ($M_{LD}$). The bulk (p-well) of each load transistor is connected to its source.

The input of the level shift circuit is $V_{SS\_COL\_i}$ and the output of is $V_{SS\_COL\_i}+\Delta V$, where $\Delta V$ is a pre-determined voltage. With this circuit configuration, the gate-source voltage and the gate-bulk voltage are kept constant even if the $V_{SS}$ line voltage raises due to the I-R drop mentioned above. Thus, the bias current for source follower circuits (which are formed by transistor 8 ($M_D$) and load transistor 50 ($M_{LD}$) through transistor 10 ($M_{SEL}$)) can be kept constant.

Figure 12:
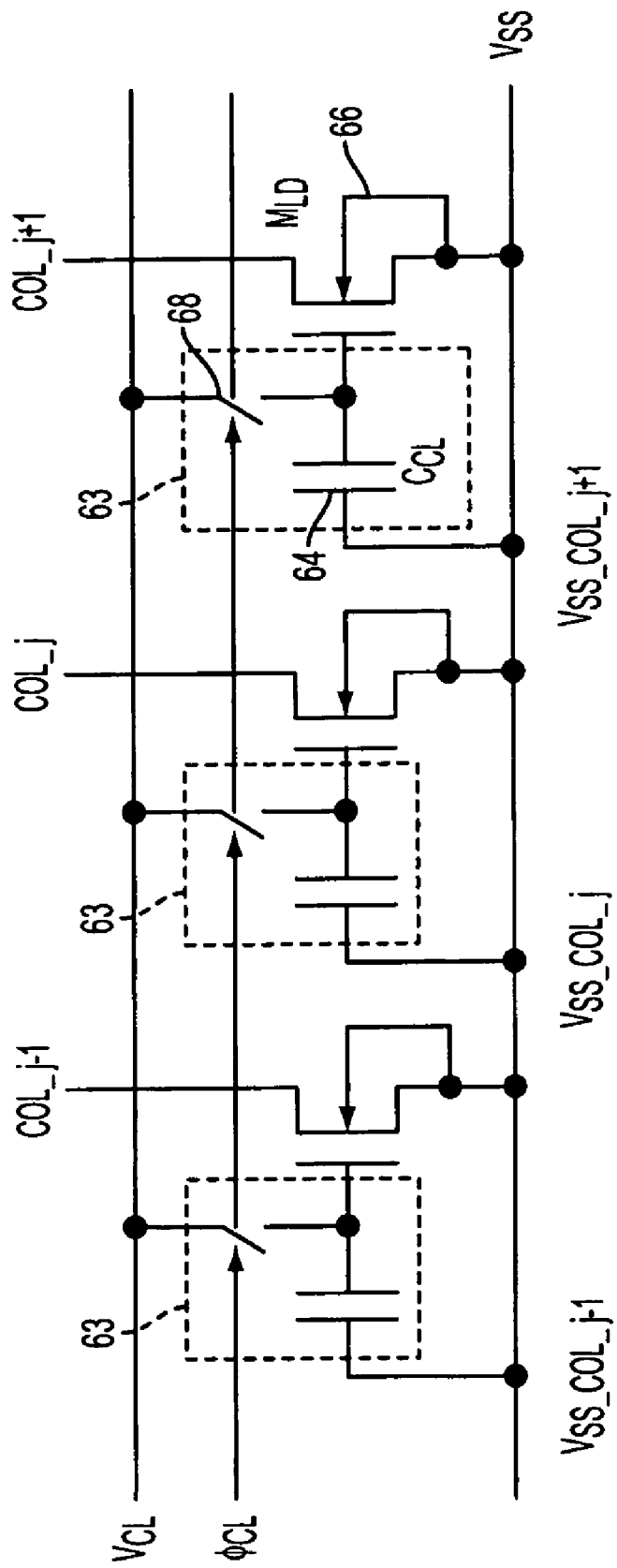
FIG. 12 is a circuit diagram of a read-out circuit for a pixel array according to a third exemplary embodiment of the invention.
Figure 13:
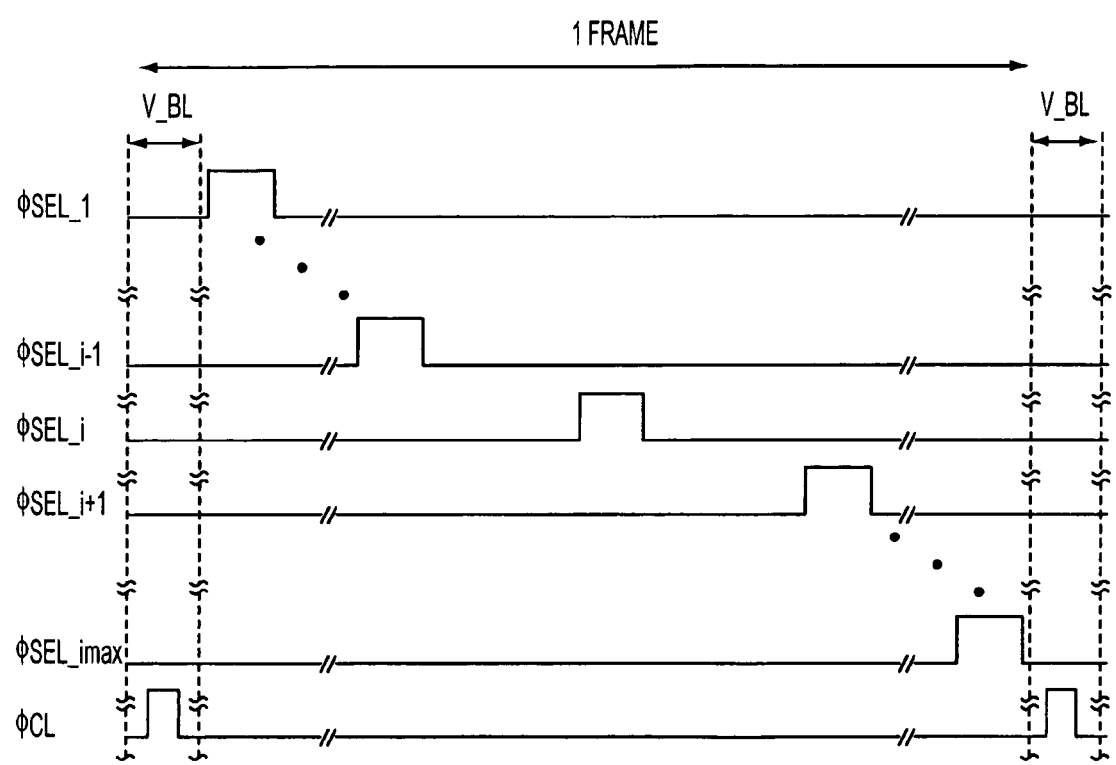
FIG. 13 is a pulse timing diagram for the embodiment of FIG. 12.

Referring to FIGS. 12 and 13, another exemplary embodiment of the present invention is illustrated in which a clamp circuit 63 is employed. The circuit diagram of FIG. 12 shows a column readout bias portion of an APS, and is similar to the embodiment described above in connection with FIG. 11, the level shift circuit 52 having been supplanted by a clamping circuit 63. FIG. 13 is a pulse timing diagram for the circuit of FIG. 12.

Each clamping circuit 63 includes a clamping capacitor 64 ($C_{CL}$) connected between the gate of a load transistor 66 ($M_{LD}$) and the $V_{ss}$ line. The gate side of clamping capacitor 64 also is connected to a voltage line $V_{CL}$ by way of a switch 68 controlled by a signal $\Phi_{CL}$.

Referring to the timing diagram of FIG. 13, during the vertical blanking period when no currents flow from $V_{AA\_PIX}$ to $V_{SS}$ (FIG. 2), the clamp pulse $\Phi_{CL}$ is turned on, thereby charging the clamp capacitor 64 at the clamp voltage $V_{CL}$. This configuration makes the gate-source voltage and the gate-bulk voltage constant even if tie $V_{SS}$ voltage rises due to the I-R drop when a row select pulse turns on.

Although the clamp pulse $\Phi_{CL}$ is applied during the vertical blanking period in FIG. 13, it is apparent that the clamp pulse can be applied any other time when the row select pulses are turned off.

Figure 14:
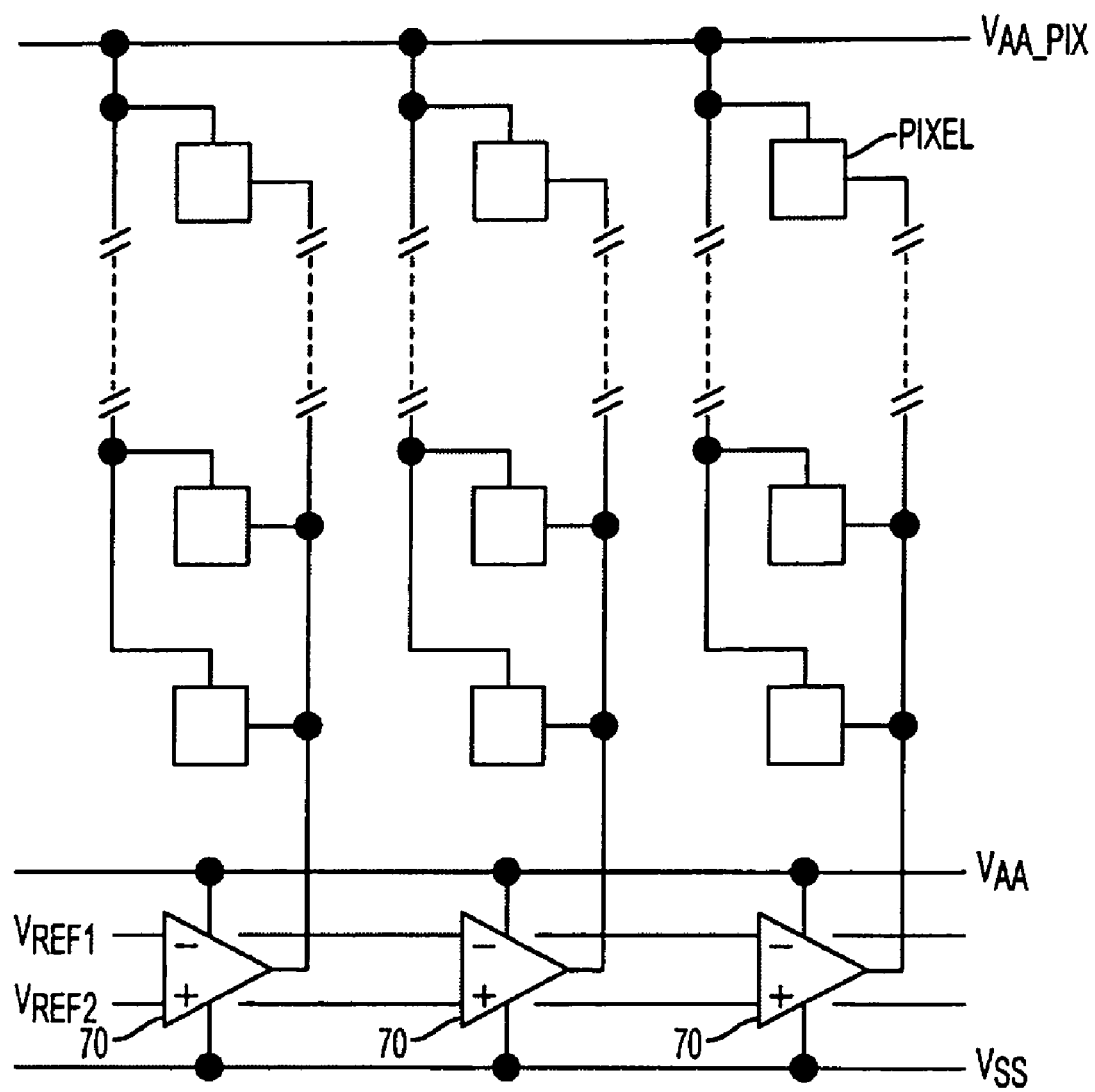
FIG. 14 is circuit diagram of a read-out circuit for a pixel array according to a fourth exemplary embodiment of the invention.

Referring to FIG. 14, a simplified circuit diagram of another exemplary embodiment of the invention is shown in which a differential amplifier 70 is placed on each column readout line. The inputs for the differential amplifier 70 are bias voltages, $V_{REF1}$ and $V_{REF2}$, and the output of each differential amplifier 70 is connected to the column line. The differential amplifier is powered by $V_{AA}$, which preferably is different from $V_{AA\_PIX}$.

The differential amplifier is designed so that it draws current, which is expressed by Equation 11 as follows:

$$I = I_2(V_{REF2}) - I(V_{REF1}) \quad (11)$$

and voltage change or noise on $V_{SS}$ line does not affect the value of the current I.

The proposed embodiments above are especially useful for large format image sensors since identical bias currents for columns can be obtained. Shading in a reproduced image, which is caused by I-R drop on $V_{ss}$ line, can be eliminated.

Figure 6:
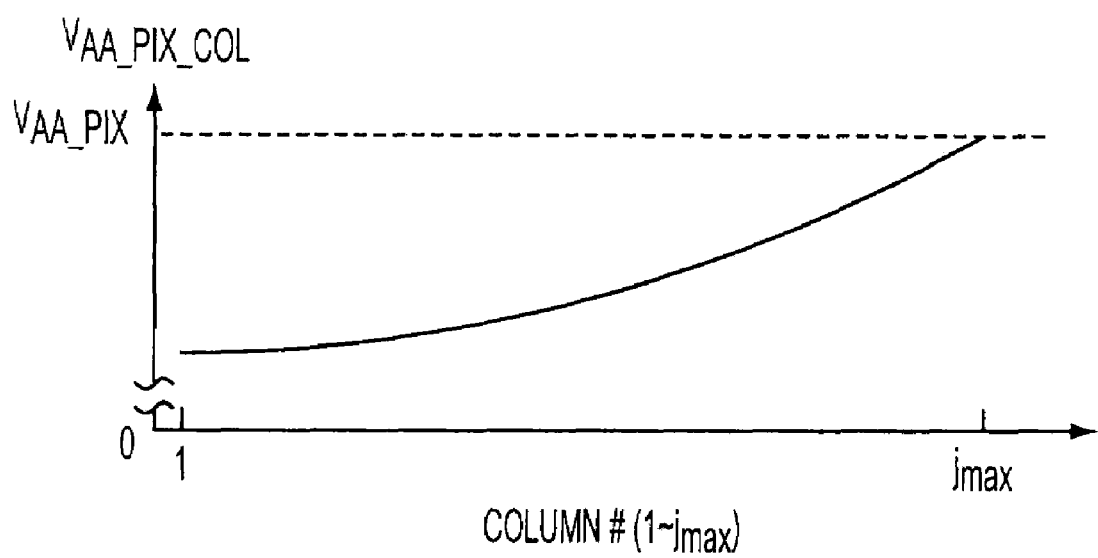
FIG. 6 is a graph illustrating voltage drops along the line $V_{AA\_PIX}$ in the conventional CMOS APS of FIG. 1.
Figure 15:
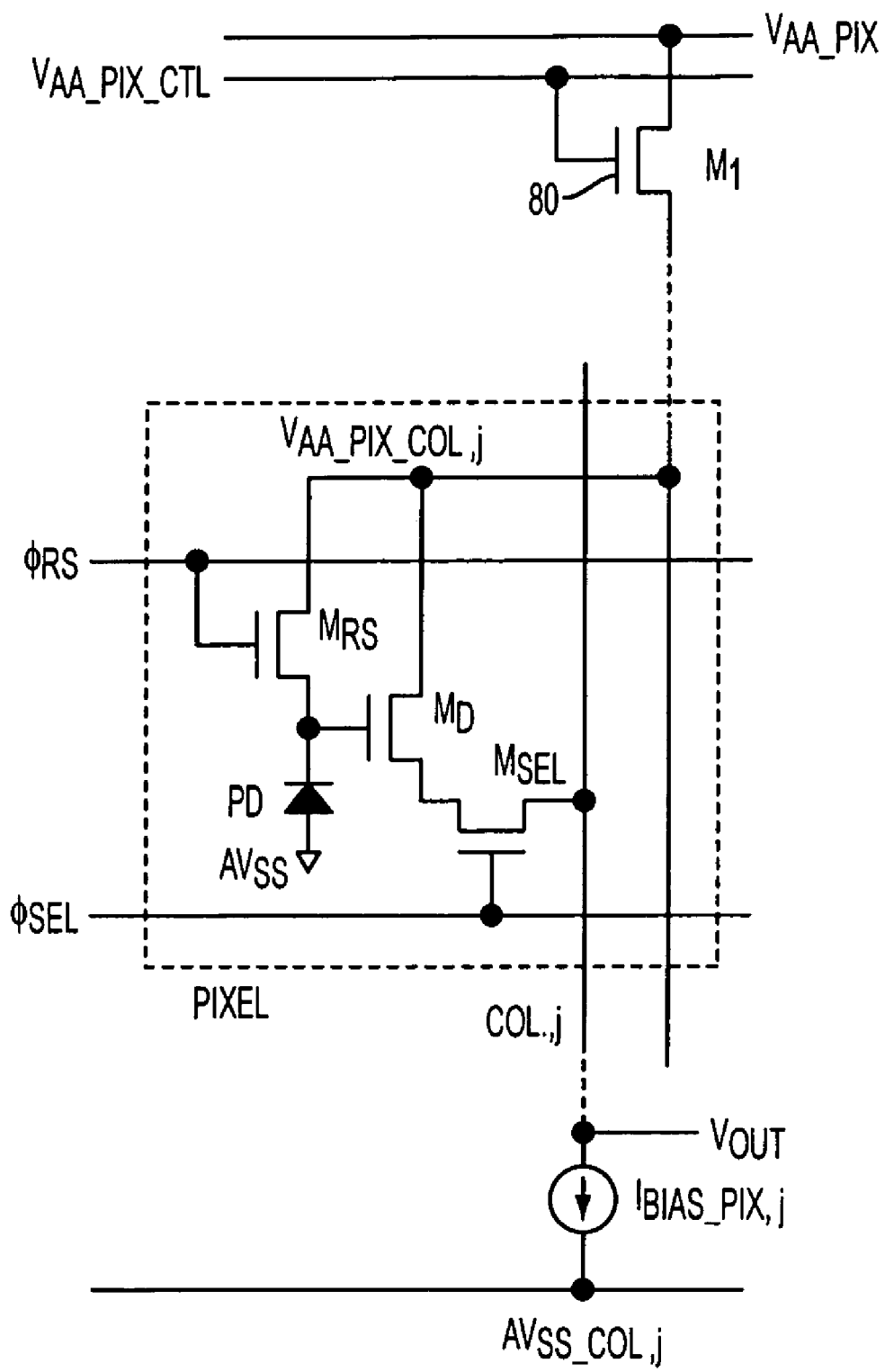
FIG. 15 is a circuit diagram of a reset circuit for filtering noise on a pixel cell according to an aspect of the invention.

Further modifications to the above-described exemplary embodiments of the invention provide for filtering of a pixel reset signal and provide for the ability to operate a 'hard' or 'soft' reset. An embodiment is shown in FIG. 15, in which an n-MOS transistor 80 ($M_1$) is connected between the $V_{AA\_PIX}$ line and the drain of $M_D$ and $M_{RS}$ of a pixel. The gate of transistor 80 ($M_1$) connects to a bias line $V_{AA\_PIX\_CTL}$ which is usually biased at the same value as $V_{AA\_PIX}$ so that transistor 80 ($M_1$) operates in its saturation region. Since no currents flow on the $V_{AA\_PIX\_CTL}$ line, the gate voltage of transistor 80 ($M_1$) is maintained constant. On the other hand, voltages along the $V_{AA\_PIX}$ line change due to the IR drop during the period when $\Phi_{SEL}$ is turned on as mentioned above in connection with FIG. 6.

The source voltage of transistor 80 ($M_1$), which is $V_{AA\_PIX\_COL\_j}$ is described by Equation 12, as follows:

$$V_{AA\_PIX\_COL\_j} = V_{AA\_PIX\_CTL} - V_{th} \quad (12)$$

where $V_{th}$ is the threshold voltage of transistor 80 ($M_1$). Thus, the source voltage is constant regardless of the voltage variation or possible noise on the $V_{AA\_PIX}$ line.

In this configuration where $V_{AA\_PIX} = V_{AA\_PIX\_CTL} = V_{AA}$, the pixel reset can be considered to be in between the hard reset and the soft reset modes of operation described above, since the drain voltage and the gate voltage of the reset transistor in a pixel $M_{RS}$ is $V_{AA} - V_{th}$ and $V_{AA}$, respectively, thus $M_{RS}$ operates around a boundary between the linear and saturation regions. If the hard reset mode is required, $V_{AA\_PIX\_CTL}$ should be slightly lower than $V_{AA\_PIX}$, so that the reset transistor inside a pixel $M_{RS}$ operates in the linear region.

Figure 16:
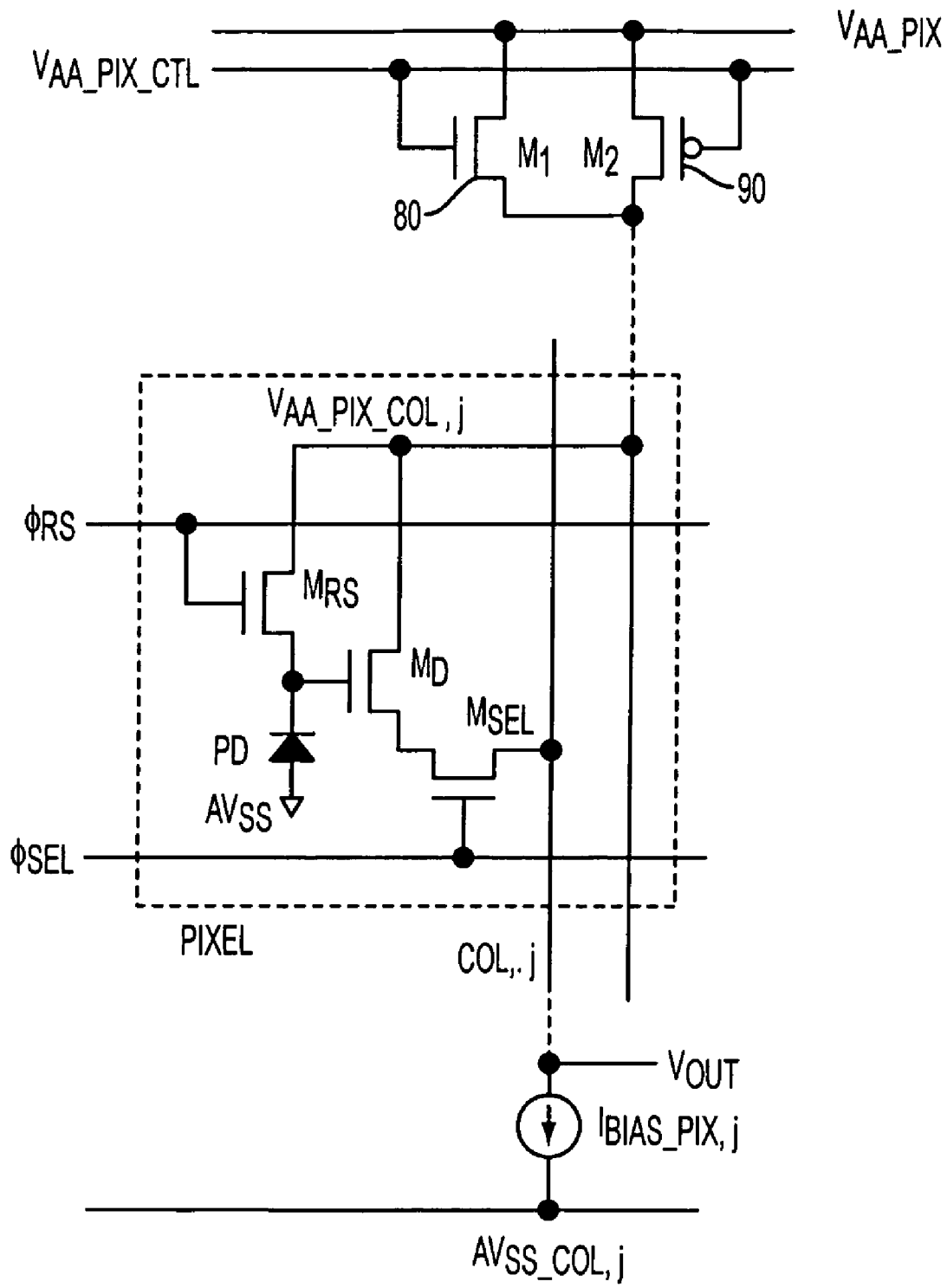
FIG. 16 is a circuit diagram of a selective hard or soft reset circuit on a pixel cell according to an aspect of the invention.

Another embodiment is shown in FIG. 16, where both the hard reset and soft reset operation modes can be obtained. A p-MOS transistor 90 ($M_2$) is added in parallel to n-MOS transistor 80 ($M_1$). When $V_{AA\_PIX\_CTL}$ is high ($V_{AA}$), transistor 90 ($M_2$) is off, and operation of the circuit is the same as in the previously described embodiment. When $V_{AA\_PIX\_CTL}$ is low ($V_{SS}$), transistor 80 ($M_1$) is off and transistor 90 ($M_2$) is on. In this case, $V_{AA\_PIX\_COL}$ becomes $V_{AA\_PIX}$ and the pixel reset is performed in the soft reset mode, assuming the pulse height of $\Phi_{RS}$ is $V_{AA}$.

Figure 17:
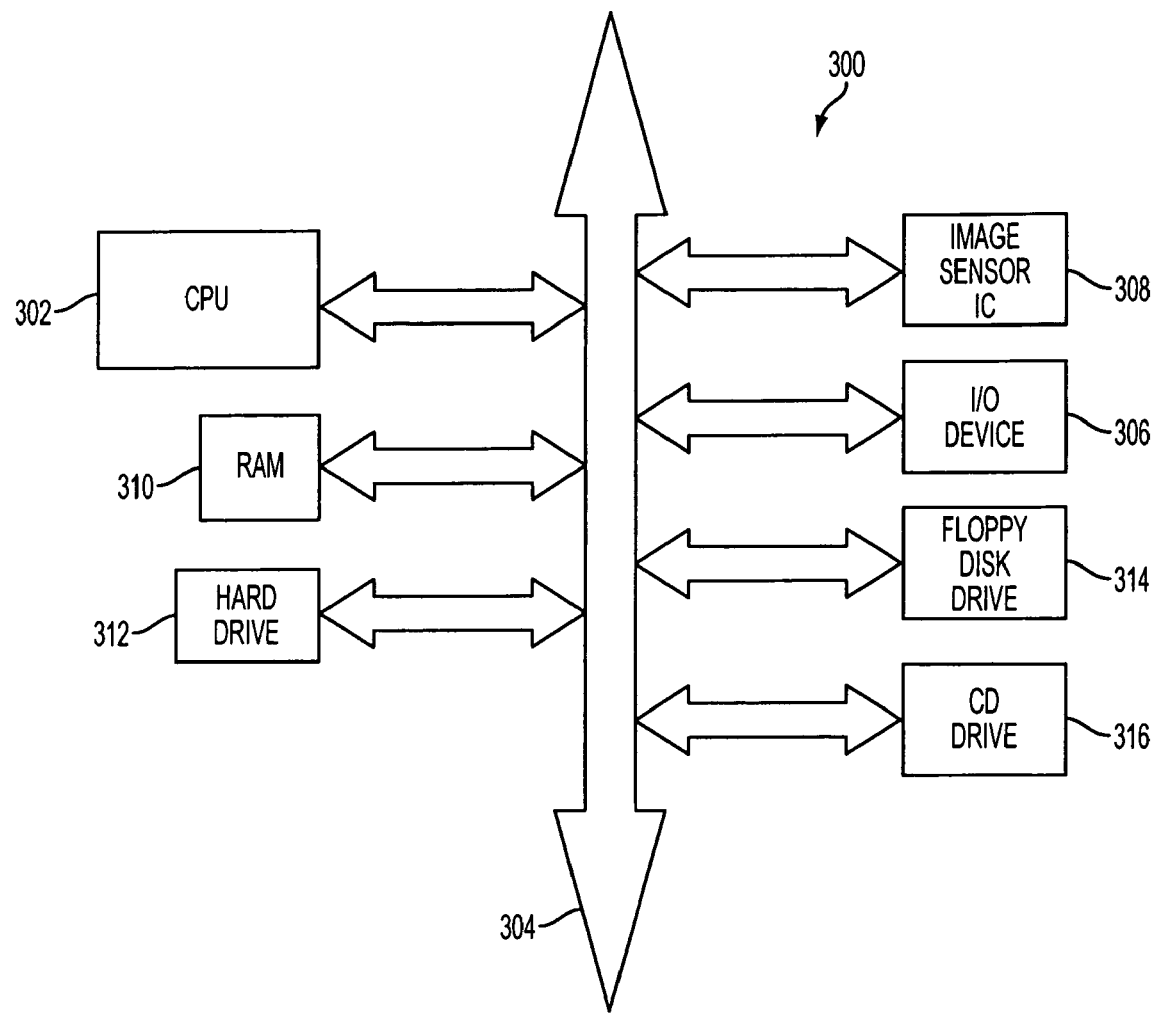
FIG. 17 is a schematic block diagram of a system that includes an image sensor chip with compensating circuitry according to another exemplary embodiment of the invention.

FIG. 17 shows system 300, a typical processor based system modified to include an image sensor IC 308 including an APS array having compensating circuitry as described above in connection with FIGS. 7-16. Processor based systems exemplify systems of digital circuits that could include an image sensor. Examples of processor based systems include, without limitation, computer systems, camera systems, scanners, machine vision systems, vehicle navigation systems, video telephones, surveillance systems, auto focus systems, star tracker systems, motion detection systems, image stabilization systems, and data compression systems for high-definition television, any of which could utilize the invention.

System 300 includes central processing unit (CPU) 302 that communicates with various devices over bus 304. Some of the devices connected to bus 304 provide communication into and out of system 300, illustratively including input/Output (I/O) device 306 and image sensor IC 308. Other devices connected to bus 304 provide memory, illustratively including random access memory (RAM) 310, hard drive 312, and one or more peripheral memory devices such as floppy disk drive 314 and compact disk (CD) drive 316.

Image sensor IC 308 can be implemented as an integrated image sensor circuit on a chip with circuitry to compensate for current gradients, as described above. Image sensor IC 308 may be combined with an image processor, which receives digitized pixel signals from a pixel array and provides digital image output signals. The process can be a CPU, digital signal processor, or microprocessor. The image sensor IC 308 and processor can be combined in a single integrated circuit.

The present invention provides methods and applications for active pixel sensors (APS) having photoreceptors arranged in an array to form a plurality of columns of image sensors. Columns of image sensors have circuitry that compensates for voltage drops in at least one of a voltage supply line and a ground line connecting the plurality of columns of image sensors.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, circuitry can provide no reset capability, or either a hard reset alone, a soft reset alone, or both alone, or in combination with each of the exemplary embodiments for addressing readout circuitry voltage drops. Accordingly, the invention is not to be considered as limited by the foregoing description but is only limited by the scope of the appended claims.

What is claimed as new and desired to be protected by Letters Patent of the United States is:

1. An image sensor comprising:
   a pixel array including a plurality of pixels arranged in rows and columns, each pixel comprising a photosensor and a source follower transistor for reading out photosensor charges, said array further including a plurality of column lines to which pixels in a column can be coupled; and a plurality of read-out circuits respectively coupled to at least some of the plurality of column lines, each of the read-out circuits configured to provide pixel output signals and including a capacitor load having a first end connected to a reference voltage line and a second end switchably coupled through a first switch to a respective column line, and a second switch for directly coupling the first and second ends of said capacitor load together.

2. The image sensor of claim 1, wherein each of said readout circuits further comprises a second capacitor load having a first end connected to said reference voltage line and a second end switchably coupled through a third switch to said respective column line, and a fourth switch for coupling the first and second ends of said second capacitor together.

3. The image sensor of claim 1, wherein said reference voltage line is a ground line.

4. An imager comprising:
a plurality of photoreceptors arranged in an array to form a plurality of columns of image sensors, each column of image sensors having associated circuitry comprising:
a first capacitive load having a first end connected to a reference line and a second end switchably coupled to a column line; and
said reference line being switchably coupled directly to said second end of said first capacitive load.

5. An imager as in claim 4, wherein said circuitry further comprises:
a second capacitive load having a first end connected to said reference line and a second end switchably coupled to said column line; and
said reference line being switchably coupled to said second end of said second capacitive load.

6. An imager as in claim 5, wherein said reference line is a ground line.

7. An imager as in claim 5, wherein said first capacitive load serves as reset signal hold capacitance and said second capacitive load serves as a image signal hold capacitance, said image sensor further comprising a signal out line and a reset outline respectively connected to the image signal hold capacitance and the reset hold capacitance.

8. An imager as in claim 5, wherein each column of image sensors further comprises:
a column reset switch for switchably coupling said column line to said reference line.

9. A method of forming an active pixel sensor, the method comprising:
forming a pixel array having a plurality of column lines; and
forming readout circuitry for the column lines, said readout circuit containing:
a plurality of first storage areas, each storage area having a first and second end,
switches for switchably coupling said first storage areas to at least some of the plurality of column lines, respectively,
switches for switchably coupling said first storage areas to a reference voltage, and
switches for directly coupling said first and second ends of said storage areas together.

10. The method of claim 9, wherein said readout circuit further contains:
a plurality of second storage areas,
switches for switchably coupling said second storage areas to at least some of the plurality of column lines, respectively, and
switches for switchably coupling said second storage areas to said reference voltage.

11. The method of claim 9, further comprising the step of:
forming switches for respectively, switchably coupling said column lines to said reference voltage.

12. The method of claim 9, wherein said reference voltage line is a ground line.

13. A camera system comprising:
an array of pixels for providing signals in response to an applied image, said array comprising:
a plurality of columns of pixels associated with respective column lines, each column line being associated with a readout circuit, each readout circuit comprising:
a first capacitive load;
a first switch for selectively coupling a first end of said first capacitive load to a column line;
a reference voltage line being coupled to a second end of said first capacitive load;
a second switch for selectively coupling directly the first and second ends of said first capacitive load; and
a processing circuit arranged to receive said signals from said array of pixels.

14. The camera system of claim 13,
wherein-said readout circuit further comprising:
a second capacitive load;
a third switch for selectively coupling a first end of said second capacitive load to said column line; and
a second switch for selectively coupling first and second ends of said second capacitive load, wherein said reference voltage line is coupled to a second end of said second capacitive load.

15. The camera system of claim 14, wherein said reference voltage line is a ground line.

16. A method of operating an image sensor comprising:
selectively coupling directly a first side of a first capacitive load to a reference voltage line;
coupling directly a second side of said first capacitive load to said reference voltage line;
selectively coupling said first side of said first capacitive load to a pixel array column line, when said first side of said first capacitive load is not coupled to said reference voltage line, to receive a first signal output by a pixel coupled to said column line;
selectively coupling directly a first side of a second capacitive load to said reference voltage line;
coupling directly a second side of said second capacitive load to said reference voltage line; and
selectively coupling said first side of said second capacitive load to said column line, when said first side of said second capacitive load is not coupled to said reference voltage line, to receive a second signal output by said pixel coupled to said column line.

17. The method of claim 16, where said reference voltage line is a ground line.

18. A method as in claim 16, wherein said first side of said first capacitive load is coupled to said reference voltage line before said first side of said first capacitive load is coupled to said column line, and said first side of said second capacitive load is coupled to said reference voltage line before said first side of said second capacitive load is coupled to said line.

* * * * *